United States Patent [19]

Costa

[11] Patent Number: 5,012,396
[45] Date of Patent: Apr. 30, 1991

[54] METHOD OF APPARATUS FOR ILLUMINATING TELEVISION STUDIO AND VIDEO TAPE PRODUCTION FACILITIES

[76] Inventor: Paul D. Costa, Burlingame, San Mateo, Calif.

[21] Appl. No.: 410,258

[22] Filed: Sep. 21, 1989

Related U.S. Application Data

[63] Continuation of Ser. No. 177,099, Apr. 4, 1988, abandoned.

[51] Int. Cl.$^5$ .............................. F21S 3/00; F21K 2/00
[52] U.S. Cl. ....................................... 362/224; 362/11; 362/221; 362/260; 362/427
[58] Field of Search ......................... 315/219, DIG. 7; 362/11, 225, 223, 235, 249, 260, 285, 287, 347, 427, 224

[56] References Cited

U.S. PATENT DOCUMENTS

| | | | |
|---|---|---|---|
| 3,733,480 | 5/1973 | Glenn, Jr. ........................... | 362/224 |
| 4,467,247 | 8/1984 | Hammer ....................... | 315/DIG. 2 |
| 4,508,996 | 4/1985 | Clegy et al. .................... | 315/219 X |
| 4,525,649 | 6/1985 | Knoll et al. .................... | 315/DIG. 2 |
| 4,782,428 | 11/1988 | Lowell et al. .......................... | 362/11 |
| 4,873,618 | 10/1989 | Frederick et al. ....... | 315/DIG. 7 X |
| 4,876,485 | 10/1989 | Fox ............................ | 315/DIG. 7 X |

FOREIGN PATENT DOCUMENTS

251775 10/1912 Fed. Rep. of Germany ........ 362/11

OTHER PUBLICATIONS

"Television Electronics: Theory and Servicing" 8th Ed. (1983), M. S. Kiver & M. Kaufman, pp. 71 & 72.
"Van Nostrand's Scientific Encyclopedia" 6th Ed. (1983), pp. 1237, 1788, 2204, 2246, 2783-2784.
"McGraw-Hill Encyclopedia of Science & Technology" 6th Ed. (1987) vol. 7, pp. 210-212.
"IES Lighting Handbook" 5th Ed. (1972), Illuminating Engineering Society pp. 2-7 thru 2-9.
"IES Lighting Handbook, 1984 Reference Volume" (1984), Illuminating Engineering Society pp. 8-19 thru 8-39.
"Television Engineering Handbook" (1986), K. Blair Benson, pp. 4.1-4.9 & 19.1-19.9.
"Television and Audio Handbook" (1990), K. Blair Benson & Jerry C. Whitaker pp. 3.2-3.9.

Primary Examiner—Stephen F. Husar
Assistant Examiner—Peggy A. Neils
Attorney, Agent, or Firm—David E. Newhouse

[57] ABSTRACT

A method of generating a light source suitable for television studios or video production facilities with high speed flourescent lighting devices.

4 Claims, 4 Drawing Sheets

METHOD OF APPARATUS FOR ILLUMINATING TELEVISION STUDIO AND VIDEO TAPE PRODUCTION FACILITIES

This application is a continuation application of Application Ser. No. 07/177,099 filed Apr. 4, 1988, now abandoned.

BACKGROUND OF THE INVENTION

1. Field of the Invention

The present invention relates to the art of illuminating television studios and video-tape production facilities or the like, and more particularly concerns an improved method of lighting studios, and an improved fixture which may be used to carry out the new method.

2. Description of the Prior Art

As television grew and became an industry there was an electronic revolution. There was first a standardization in television systems, then an energetic refinement in the equipment that processed visual information.

While there were great advances made in the camera and image processing systems, there was little if any concern given to what is perhaps the most crucial element of visual media—light.

Lighting fixtures for early television stations were a combination of theatrical and motion picture lighting equipment. These lighting fixtures were created to send as much light from a single source as possible. Consumption of power was rated in kilowatts and the more a fixture required the better. This was a proper and necessary approach as cameras were in a crude stage of development and the higher the light quantity the better the resultant picture would be. The resultant picture by today's standards was monocromatic (black and white), high in contrast and low in detail.

Today the technology that supports camera imagery and television signal processing is highly developed. Cameras have been constructed that measure the very subtle qualities of light. Quantity is not the most important factor in lighting. Many cameras have threshold levels of low footcandle values.

Today the technology that supports television studio lighting is the same technology which launched television. Minor refinements have not changed the basic premise that the most light generated is best.

The intense amount of light coming from a single source fixture has presented some problems. People appearing on camera often have shadows crisscrossing their features. The heat and intensity of conventional lighting often causes oncamera people to perspire. The heat generated by conventional lighting demands an immense energy requirement to cool the rooms in which they operate. Many of the special effects used in television broadcast and video production require that the light levels and quality of light within a scene be evenly distributed. Should the light be uneven, visual distortion or improper superimpositions will occur. It is difficult to light a large area like a television studio set evenly with a multiple number of single source incandescent lighting fixtures.

Some effort and innovation has been spent in an attempt to diffuse or spread the light from single source fixtures. This has created some nice lighting effects, but, generally has not solved the disadvantages of high energy consumption, heat generation and uneven lighting.

To improve the lighting in television and video studios certain changes must be made in the way light is generated for production or broadcast. An ideal source of light for television studios and video tape production would be diffuse (not originated from a single point but emitted evenly from a large surface area), generate little heat, be steadfast in its color temperature and offer efficient energy consumption requirements.

I have discovered that a fluorescent tube can be an excellent light source for video and television production. Fluorescent lighting is created within a vacuum tube lined with a blend of oxygen type phosphor materials. An electrical charge is induced at the opposing ends of the tube and generates an ionic discharge that runs throughout the length of the tube. This energizes the phosphor lining, exciting it so that energy in the form of light is emitted. The emission persists for a short time.

Fluorescent lighting has become the most progressive form of lighting today. In pursuit of efficient lighting a great deal of study, development, and refinement of the fluorescent systems has been done.

Traditional fluorescent lighting operates at a rate of sixty cycles per second (some countries operate on a 50 cycles per second rate). This rate is the number of times the phosphor material is excited to its highest level of Light emission within the span of a second. Thus, if you divided a second into sixty parts you would see an arc of discharge for each portion of that second. If one were to slow the process (time-base of the process) spaces could be seen between the light emissions. The glow peaks abruptly on the entire surface of the tube then the glow fades in intensity. So, in a short period of time (one sixtieth of a second) the fluorescent tube has its filaments charged, emits light, then fades. The human eye does not notice these fluctuations at sixty cycles per second.

Motion picture cameras with shutter speeds of 24 or 25 frames per second will record an inconsistent glowing flicker from these lights as they photograph the various light levels of the tube in operation. It is this uneven flicker that has given fluorescent lighting a bad name in media operations. Most lighting directors have seen the uneven flickering of fluorescent lighting in films and believe that fluorescent light is green in color and inconsistent in operation. In truth it is quite consistent but has yet to be optimized to video or television applications.

It is also well understood that fluorescent tubes produce light largely by conversion of ultraviolet radiations from luminescence gas discharges within the tube into visible light through a process called photoluminescence, i.e. a nonthermal emission of electromagnetic radiation by materials called "phosphors" upon excitation or absorption energy from ultraviolet radiations generated in the mercury vapor arc. The absorption and re-radiation of the light at the longer wavelengths by the phosphors is variously described as fluorescence and phosphorescence. The phosphors are typically high purity crystalline compounds which are deposited onto the interior walls of the tube. [See *IES Lighting Handbook* 5th Ed. 1972, pp 2-8, 2-9.]

By convention fluorescence is defined as the process of emission of electromagnetic radiation by a substance as a consequence of the adsorption of energy from radiation, provided that the emission continues only so long as the stimulus producing it is maintained, i.e., a luminescence which ceases within about 10 nanoseconds after excitation stops. Phosphorescence is defined as luminescence that is delayed more than 10 nanoseconds after excitation stops. [See *Van Nostrand's Scientific Encyclopedia* 7th Ed. pp. 1194, 1737 and 2189-90.]

The gas within the tube through which the gas discharge or arc is maintained typically includes mercury (Hg) vapor which provides a copious source of ultraviolet radiation when stimulated by collisions with conduction electrons of the electrical discharge or arc which stream between the respective electrodes at either end of the tube. Electrical ballasts supply both the electrical current (typically in pulses) and the necessary potential difference between the respective electrodes at the ends of the tube for maintaining the discharge or arc through the gaseous medium in the tube.

I have discovered that the perfection of solid state electronic ballasts have changed important characteristics of fluorescent lighting. The development of these solid state ballasts have made fluorsecent light something that can be formulated into a superior light source for television and video applications.

SUMMARY OF THE INVENTION

The present invention offers a system of television studio and video production lighting that delivers a large quantity of high quality light with little power consumption and low heat generation. The light utilized in this invention actually adds enhanced values to the television broadcast signals and video-tape imagery when compared to incandescent lighting.

The formulation of fluorescent tubes that operate at a given color temperature and solid state ballasts that increase the speed of operation make a light source that can be optimum for television broadcast and video studio work.

Solid State ballasts can operate comfortably at a rate of 10,000 to 100,000 cycles per second. This means that thousands of times a second there is an emission of light from the surface of the tube. The interval between the light emissions is greatly reduced as the frequency is increased. At these high rates of speed the light emission of the phosphorescence is sustained at an optimum level.

This rapid rate of operation makes it possible to optimize fluorescent lighting for television and video operations. A reliable solid state ballast which performs as necessary within this invention is Ballast Model Number SSB1-120-3/40TB available from EBT Systems located at 2808 Oregon Court, K-4 Torrance, Calif. 90503.

The video systems are repeatedly looking for visual information. This information is light that has been reflected from a subject. A high speed constant light emission fluorescent tube generates a form of light that supplies the camera with a constant level of light.

The effect improves the resolution of the video system because as the electronic camera scans across a pixel line, the fluorescent tube is glowing at a high duty cycle level and sustained there by multiple internal ionizations within the tube. This formula of light means that as the camera is interpreting reflected light information from a subject there is a seemingly constant peak of light from pixel to pixel.

The electrical currents that support the ionicplasmatic light emissions from the fluorescent tubes are extremely stable. Color temperature is a critical part of television and video operations lighting. Fluorescent light sources have a formulated color spectrum known as a color rendering index. With manipulation (formulating) of the phosphorus materials and the stabilizing of the currents supporting the ionization charges, a full color spectrum can be consistently standardized for television or video cameras. Formulation of the phosphorus tube lining and manipulation of the electric charge results in the generation of a light source that presents colors at optimum levels and is higher in value than incandescent lighting sources are delivering today.

It should be appreciated that per conventions adopted as standards in the television and video industries, that electronic scanning cameras successively analyze or synthesize (sample) the light values of picture elements or pixels constituting the picture area according to a pre-determined method. In the United States, per standards adopted by the television industry, 30 frames consisting of 525 pixel lines are presented each second where each frame is further broken down into two parts or fields of even and odd number lines of 262.5 lines respectively. This standard provides an actual repetition rate of 60 fields/second or 60 Hz. (for color at the rate of 59.94 Hz.). Each line consists of 510 pixels or picture elements. [See *Van Nostrand's Scientific Encyclopedia* 7th Ed. pp. 2794-2798.] This means that under the U.S. convention, electronic scanning cameras scan at rate of approximately 15750 lines/second or 8,032,500 pixels/second. By inverting these numbers, the duration of the camera's sampling per line and per pixel are approximately 63.4 microseconds/line and approximately 124.3 nanoseconds/pixel, respectively.

The reflectance characteristics of this high speed illumination device is unique. The light emitted from the fluorescent tube is coming from all of the tube's surface. Instead of a single source light there is actually millions of light sources from a wide angle pattern reflecting from the object in front of the camera. This sharpens the detail of lines and outlines of subjects on camera. Shadows become faint and there is no harsh line of shadow. Visual information within shadow areas is increased and a higher resolution of detail or pattern can be seen.

Single source lighting creates numerous shadows within a scene. These create black areas or pixels that are often immediately next to a bright or light shaded pixel. This rapid and drastic change in light values require the video systems to operate at their extreme maximums. Often in the readjusting and perpetual resetting between these black and white picture areas, distortion and loss of pictorial quality occurs.

Fluorescent lighting fills the shadow areas of the scene and reduces the amount of readjustment or resetting between pixels as visual information is interpreted. This reduces the amount of picture contamination in the video or television system. Objects are lit from all visual sides (camera point of view). Due to the large area from which light is being emitted objects have light coming to them from a wide angle. Details of what would have been dark shadow areas (in conventional lighting) are read by the camera in their true colors, values and detail.

These differences can be seen and quantified by the means of a vectorscope (the electronic monitoring device of chroma and phase information) and the waveform monitor (the electronic monitor of light level and contrast information). When standard calibration charts placed before the camera are lit with tungsten light and high speed fluorescent (between 10,000 and 100,000 cycles per second) alternately, improvements are seen in the technical areas. In every instance the resulting fluorescent light tested is suitable for television studio and video tape operations and offers some definite advantages over the single source tungsten.

The fluorescent principal is much more efficient than the incandescent (tungsten-vapor/gas/bulb) lighting principal. High speed fluorescent systems in a television or video studio would require about one forth the amount of energy of tungsten systems. Another truly valuable characteristic is fluorescent lighting's ability to produce good amounts of light with relatively little heat generation. This quality is greatly appreciated by performers and it reduces the energy load on supportive systems like air conditioning.

It is conclusive that a high speed fluorescent lighting source can deliver a value of lighting for television and video applications that supercedes the quality of tungsten lighting, operates at a much higher efficiency and enhances the technical performance of the video systems.

BRIEF DESCRIPTION THE DRAWINGS

FIG. 3 is an enlarged fragmentary diagramatic section taken along line 3—3 of FIG. 1.

DESCRIPTION OF A PREFERRED AND EXEMPLARY EMBODIMENTS

Figure 1:
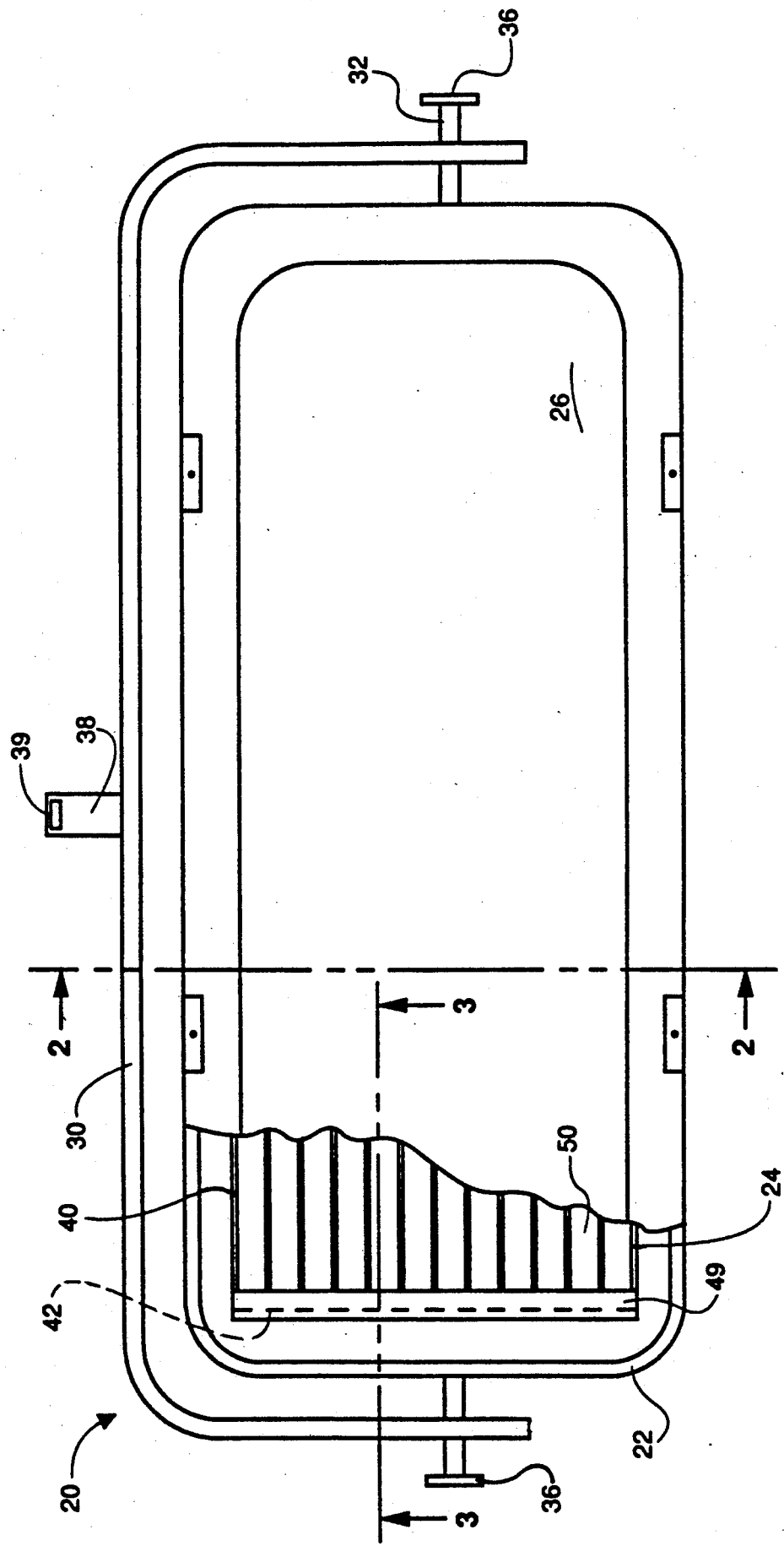
FIG. 1 is a diagramatic front elevation, with parts broken away, of the improved fixture adapted for use in the present invention.
Figure 2:
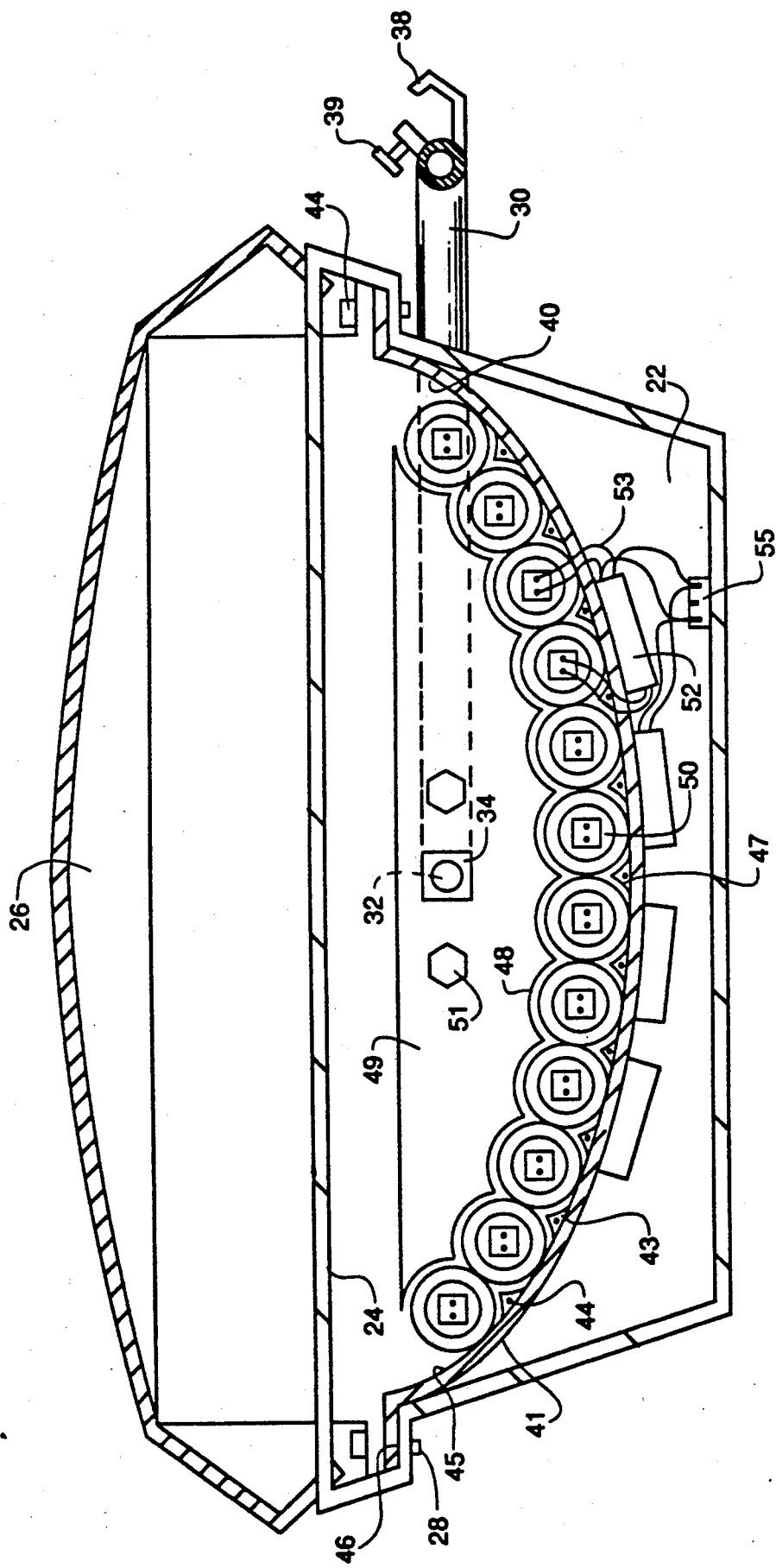
FIG. 2 is an enlarged diagramatic section taken along line 2—2 of FIG. 1.
Figure 7:
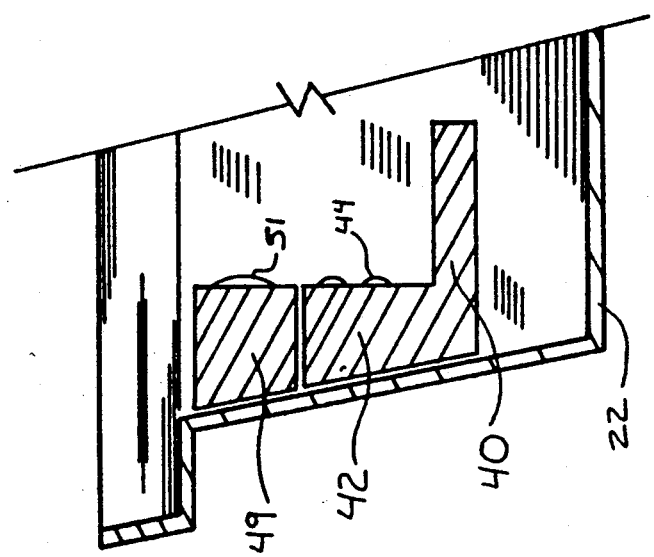

In FIG. 1 the reference numeral 20 indicates generally a fixture constructed according to the teachings of the present invention. The fixture includes a box-like housing 22 which has an open side 24 that, when the fixture is assembled, is closed by a frosted diffusion lens 26. While the fixture may be made in various sizes, in one embodiment the housing, is approximately 54 inches long, 24 inches wide, and 10 inches deep and is constructed of rigid ABS fireproof plastic material three-eighths inches thick. The diffusion lens 26 is removably secured to the housing by capscrews 28 (FIG. 2). This embodiment of the invention utilizes fluorescent tubes that are 48 inches in length.

A mounting yoke 30 (FIG. 1) extends around the exterior of the housing 22, being pivotally and adjustably mounted at opposite sides of the housing on studs 32. Each stud 32 is attached to a small plate 34 that is secured by a suitable adhesive to the inner face of the associated side wall of the housing. The outer end of each stud 32 is threaded to receive a nut 36. A clamp 38, which carries clamping screw 39, is welded to the yoke 30 intermediate its length, as seen in FIG. 1.

A reflector 40 (FIG. 2) is mounted interiorly of the housing 22. This reflector is a rigid structural member that includes a curved rear wall 141 and spaced, forwardly projecting side wings 42 (FIG. 1) and 43 (FIG. 2). Each of the wings is secured by capscrews 44 to an adjacent side wall of the housing 22, thus mounting the reflector securely in the housing. The reflector, which may be molded of one eighth inch rigid fire-retardent plastic, has a forward, concave, reflecting surface 45 and rests by means of a flange 46 upon the lip of housing. This capscrews 28, that hold the diffusion lens 26 in place, extend through the flange secure the reflector to the housing 22.

Scallops or corrugations 47 are formed on the forward edge of each of the reflector wings 42 and 43. These corrugations 47 cooperate with corrugations 48 on the rear, curved edge of a retainer plate 49 to define pockets which receive the ends of the fluorescent tubes 50 that are used in the fixture.

Figure 4:
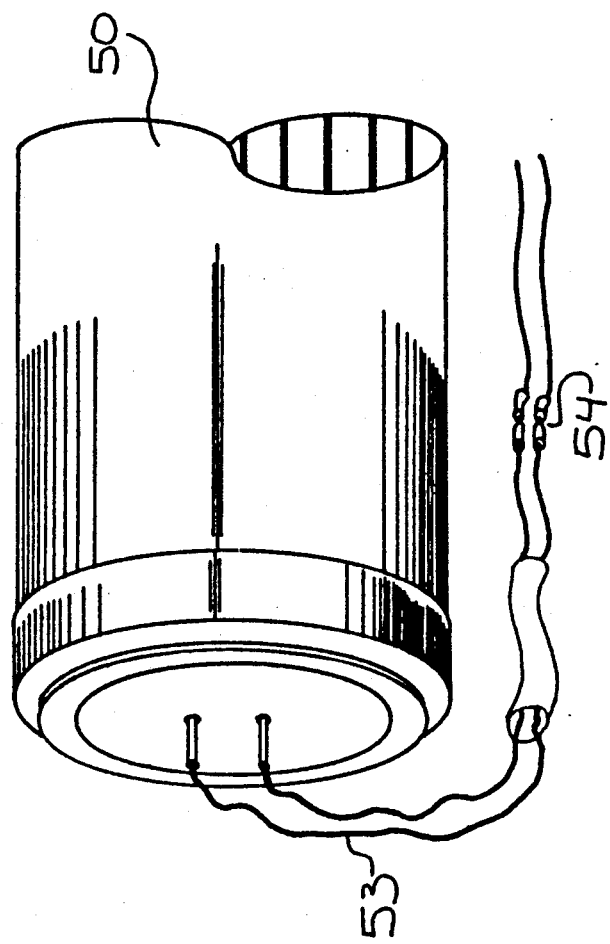
FIG. 4 is an enlarged diagramatic showing of a typical connection at one end of a fluorescent tube.

There is one retainer plate 49 associated with each of the side wings 42 and 43 of the reflector so that each tube is held in position at both of its ends. To facilitate the replacement of the tube, each retainer is removably secured to an adjacent sidewall of the housing by capscrews 51. Attached to the reflective insert 40 are an appropriate number of ballasts 52 that contain electronics to generate high speed fluorescent lighting (at a frequency between 10,000 to 100,000 cycles per second). The ballasts and fluorescent tubes are connected by insulated wires 53 (FIG. 4) and utilize detachable connectors 54 for service or tube replacement.

Mounted to the housing 20 (FIG. 1) is the external power plug 55.

From the foregoing description it will be apparent that the present invention provides a unique fluorescent lighting system that is particularily adapted to the illumiation of television broadcast studios and videotape production facilities.

What is claimed is:

1. A method for illuminating a television studio and video tape production facilities comprising the steps of,
   a. mounting a plurality of fixtures at spaced locations around the studio, each fixture including an array of fluorescent tubes, each tube having a formulation of phosphors coating the interior surface of the tube for generating fluorescent and phosphorescent light emissions at frequencies having a color spectrum suitable for illuminating television and video production without a filter or filter system,
   b. energizing said tubes with electrical current pulses provided by an electrical ballast having an operational frequency in the range of from 10,000 to 100,000 cycles per second for stimulating sustained fluorescent and phosphorescent light emission from the phosphor coatings on the interior surface of the tubes,
   c. directing light rays from the tubes away from the fixtures and inwardly towards the studio.

2. A fluorescent lamp optimized as an illumination source suitable for electronic scanning television and video cameras comprising in combination:
   a. a support housing,
   b. a mounting yoke pivotally coupled to opposite sides of the housing for adjustably supporting the housing,
   c. a longitudinal concave reflective surface secured within the housing for directing light out one face of the housing,
   d. at least one fluorescent light tube having a pair of electrodes at each end, mounted within the support housing proximate the concave reflective surface, the fluorescent light tube having a formulation of phosphors coating the interior surface of the tube for generating fluorescent and phosphorescent light emissions responsive to stimulating ultraviolet radiation at frequencies giving a color spectrum optimized for the particular electronic scanning camera, and
   e. an electrical ballast means having an operational frequency in the range of from 10,000 to 100,000 cycles per second secured within the housing behind the concave reflecting surface electrically connected between the respective electrodes at either end of the fluorescent tube and to a source of electrical energy for generating exciting electrical current pulses through the tube inducing ultraviolet radiation pulses at a rate for stimulating pulses of fluorescent and phosphorescent light emissions from the formulation of phosphors coating the interior surface of the tube of sufficient duration that each stimulated fluorescent and phosphorescent light emission pulse has a duration overlapping that of the next stimulated fluorescent and phosphorescent light emission pulse due to the next exciting electrical current pulse, whereby, a resultant constant illumination source is sensed by the television/video camera.

3. A device according to claim 2 wherein a plurality of said fluorescent tubes are mounted within the support housing proximate the concave reflective surface and in close contact with each other, the light emissions emanating from the sides and rear sections of the energized tubes radiating both directly to the reflective surface and through walls of adjacent tubes to the reflective surface and being reflected off of the concave reflective surface back through the excited tubes to stimulate radiative transitions in the phosphor coatings for amplifying the radiative emissions radiating from face of the housing; and wherein a plurality of said electrical ballast means are secured within the housing behind the reflective surface, each ballast means electrically connected between the respective electrodes at either end of one fluorescent tube and to the source of electrical energy generating exciting electrical current pulses through each tube inducing ultraviolet radiation pulses within each tube at a rate for stimulating a train of fluorescent and phosphorescent light emission pulses from the formulation of phosphors coating the interior surface of each tube, where each fluorescent and phosphorescent light emission pulse has a duration overlapping that of both its predecessor and successor light emission pulses in the pulse train.

4. A high speed fluorescent lighting instrument according to claim 3 wherein the plurality of fluorescent tubes are unfiltered.

* * * * *